United States Patent Office 3,307,293
Patented Mar. 7, 1967

3,307,293
METHOD OF CONDITIONING SOIL
James R. Truax, 3717 Vera Cruz Ave. N.,
Minneapolis, Minn. 55422
No Drawing. Filed Oct. 4, 1965, Ser. No. 492,857
4 Claims. (Cl. 47—9)

This invention relates to a novel method of conditioning soil and more specifically to a method of conditioning soil in which a soil conditioning copolymer in a fluid condition is applied to the surface of the soil and forms a film therewith.

An increased interest has developed recently with respect to methods of conditioning soil especially where mulch materials are applied to the surface of the soil primarily for the purpose of preventing erosion and conserving the moisture in soil. Some of the prior art soil conditioners constitute mulch films which are applied to the surface of the soil in newly seeded areas and which are intended to prevent erosion, prevent crusting, conserve moisture and in general promote rapid seed germination and healthy plant metabolism. Although some measure of success has been achieved with these prior art soil conditioning processes, for the most part these prior art processes have proven much too expensive in their preparation and application to be commercially feasible at the present time.

It is, therefore, a general object of this invention to provide a novel method or process for conditioning the soil and in which a copolymer, calcium alginate, is applied in fluid condition to the surface of the soil and forms a film therewith so that a continuous protective covering is provided.

A more specific object of this invention is the provision of a novel method of conditioning the soil which comprises reacting sodium alginate with calcium chloride to form calcium alginate and applying the latter while in a liquid condition to the surface of the soil to form a film which intimately bonds the particles of soil together thereby conditioning and maintaining the soil for optimum seed germination and healthy plant metabolism.

In accordance with the present invention, the process or method comprises the steps of preparing and applying calcium alginate, while in a fluid condition, to the surface of the soil, to form a film which quickly sets to intimately bond the surface particles of soil together so that a continuous protective covering for the soil is formed. The calcium alginate film may be readily prepared by reacting an aqueous solution of sodium alginate with a dilute aqueous solution of calcium chloride. Generally speaking, certain physical characteristics of the calcium alginate film as well as the time required for the film to completely set may be varied slightly by the ratio of sodium alginate to calcium chloride. Further, the thickness of the film to be formed will be dependent by such factors as the general climatic conditions, the particular soil being treated, and the specific plant seedlings involved. The calcium alginate film, even though it forms a continuous covering with the soil, will be penetrated by the growing plants and will not interfere with the growth thereof. The calcium alginate film will eventually disintegrate substantially after germination and after the plant has become established. It has further been found that even when the calcium alginate film begins to disintegrate, the tilth of the soil is maintained for a substantial period thereafter.

Under certain conditions, it is desirable to produce a film which is somewhat more resilient than under ordinary conditions. It has been found that the calcium alginate soil film could be made more elastic by the incorporation of certain plasticizers therein. Specifically, it was found that the calcium alginate film could be rendered more resilient and elastic by the incorporation therein of various amounts of vegetable oils (between 1–25 percent by weight). Since corn oil is quite inexpensive and is readily available in bulk quantities, it is an ideal vegetable oil for use in the calcium alginate film although other suitable vegetable oils such as cotton seed oil, soybean oil, etc., will also give suitable results.

The incorporation of the vegetable oil as a plasticizer is achieved by emulsifying the oil with the sodium alginate solution by a suitable emulsifier prior to reacting the sodium alginate solution with the calcium chloride solution. The particular types of emulsifiers may be varied, for example, from the synthetic type such as the higher alkylthenoxypolyoxyethylene ethanols sold under the trade name Igepal DM–530 and Igepal DM–710, to the mixed type (natural-synthetic) such as lecithin-Tween 80 (polyoxyethylene derivatives of fatty acid partial esters of hexitol anhydrides). A modified emulsifier such as water dispersible lecithin sold under the trade name Emultex W may also be used in the preparation of the calcium alginate film. Water dispersible lecithin may also be used as a plasticizer when the same is incorporated into the calcium alginate film. Another suitable emulsifier which may also be used alone as a plasticizer with the calcium alginate film is the combination of glycerol monostearate and propylene monostearate which is sold under the trade name Myvatex 3–50.

It has also been found that small amounts of certain kinds of fertilizers such as water soluble nitrates are compatible with the calcium alginate film and may be added to the sodium alginate emulsion when desired. Similarly, the optical properties of the alginate film may also be varied by the addition of color dyes to the sodium alginate emulsion so that the light absorption capabilities of the film may be varied. Under certain conditions, in order to give the calcium alginate film more body or a longer life, inert material such as sawdust or the like may be incorporated therein. When the sodium alginate emulsion is preformed, the shelf life thereof may be prolonged by the addition of relatively small amounts (0.1 percent–0.3 percent) of a suitable preservative such as formalin. Other suitable preservatives may also be used such as sodium orthophenylphenate or sodium pentachlorophenate.

When the alginate film is applied to the surface of the soil of the seed bed, the calcium alginate film forms an intimate bond with the particles of soil and forms a continuous covering therewith. The highly desirable structural characteristics of the soil of the seed bed, that is the tilth of the soil, will be maintained throughout the germination period and for a substantial period after the film begins to disintegrate. The calcium alginate film also very effectively prevents erosion and the evaporation of the moisture within the seed bed. Thus the idle or optimum conditions of the soil for optimum germination and healthy metabolism of the plants is effected. It has been found that test plants such as ryegrass, could readily penetrate the calcium alginate soil film so that the film does not interfere or otherwise inhibit the growth of the plant after germination.

Although the calcium alginate film is water insoluble, it is somewhat permeable to gases such as water vapor so that while some gas exchange action will take place through the film, the film is highly effective in conserving moisture in the soil. Although the strength characteristics of the film will be dependent in part upon the film thickness, the dry film is not only capable of some bending but is also somewhat resilient and elastic when applied to the surface of the soil. With respect to the film thickness, it is desirable that the soil film be approximately 1–3 mils thick when in the dry condition and approximately 15–20 mils thick when in the wet or moisture condition.

The film may be applied by any suitable applicator such as spray type dispensers. To this end, one spray type applicator may be used to apply the sodium alginate emulsion to the surface of the soil and another applicator may be used to apply the calcium chloride solution in the same manner at the same time. Other applicator systems may be used such as the double nozzle applicators which admix the sodium alginate emulsion and calcium chloride solution as they are discharged from their respective nozzles or orifices. A different equipment system would be necessary when sawdust or other materials which lend body to the film are actually dispensed in the calcium alginate film. When the film is applied to the soil, it will set up quickly and obtain maximum strength in a period of several hours under normal drying conditions.

The calcium alginate film when applied to the soil, also serves as a protective covering to the seed bed against disease producing agents such as airborne bacteria, molds, fungus, virus and the like. As pointed out above, the tilth of the soil is maintained even after the film begins to disintegrate since the crusting surface particles are still bound together. This condition minimizes splashing when the seed bed is subjected to rain so that there is little likelihood of contamination of the leaves of the plant which quite often results from splashing. The film also serves to prevent excessive leaching of the soluble fertilizers which have been added to the soil prior to the application of the film.

The following examples are illustrative of the method of this invention:

*Example I*

| Constituents: | Parts by wt. |
|---|---|
| Sodium alginate | 19 |
| Corn oil | 76 |
| Alkylphenoxypolyoxyethylene ethanol (emulsifier) [1] | 38 |
| Water | 3667 |

[1] Sold under the trade name Igepal DM-710.

The above sodium alginate emulsion is prepared by first dissolving the given amount of sodium alginate in approximately ¾ of the required volume of water with vigorous agitation. The remaining ingredients as well as the remaining volume of water is added with vigorous agitation.

The sodium alginate emulsion (1 gal.) is then applied to a 25 sq. ft. soil plot from a (2 gal.) Hudson pressurized sprayer. A 0.75% calcium chloride solution (0.5 gal.) required to film the algin as its calcium salt is sprayed on in the same manner in the same time. The soil was cultivated and raked loosely but was not rolled before spraying. The soil plot was also seeded with ryegrass prior to the application of the alginate film. The film set up quickly and obtained maximum strength in a period of several hours under normal drying conditions, that is no rain.

After one week, the film was still intact with no evidence of drying up or flaking. After thre weeks, the film was still in place on the soil, and the grass appeared to be fairly thick and growing well. Control plots having no films (not listed as examples), on the other hand appeared to be washed out, "eroded," with the grass shoots that did germinate being short in length by comparison. After one month, the ryegrass was growing well on the plot having the film while the grass was very thin on the control plot having no film. It was also noted that after one month there was no visible sign of any film on the experimental plot which the film had been applied.

*Example II*

The method of Example I was repeated, except that the film was applied to well rolled soil. The results obtained was substantially the same as those described in Example I. It appeared, however, that the film applied to the unrolled plot of Example I was somewhat more stable than the film applied to the rolled plot of Example II. It appears that the surface irregularities of unrolled plots offer more projections and particles for the film to adhere to than the rolled plot.

*Example III*

| Constituents: | Parts by wt. |
|---|---|
| Sodium alginate | 19 |
| 65% soyphosphatides in a carrier of 35% soil (emulsifiers) [1] | 38 |
| Corn oil | 19 |
| Polyoxyethylene derivatives of fatty acid partial esters of hexitol and anhydrides (emulsifier) [2] | 49 |
| Water | 3675 |

[1] Sold under the trade name Sta-Sol, 65% lecithin.
[2] Sold under the trade name Tween 80.

The above sodium alginate emulsion is prepared in accordance with the method of Example I except that heat and vigorous agitation is required to disperse the algin solution. A 0.75% calcium chloride solution (0.5 gal.) is combined with the sodium alginate emulsion (1 gal.) when the material is applied to the plot having unrolled soil and of the same size as the plot for Example I and which was also seeded with ryegrass. The film of this example while producing substantially the same results as Examples I and II did not remain intact quite as long as the films of Examples I and II. The grass was growing well after one month and was substantially thicker than the grass on the control plots which contained no films.

*Example IV*

Example III was repeated except that the film was applied to a plot identical to the plot of Example III but having well rolled soils. The results obtained was substantially the same as those described in Example III except that the film was not quite as stable as the film of Example III. It again appeared as though the irregular surface (cultivated and raked but unrolled) permits better adherence of the film to the particles of soil rather than the well rolled surface.

*Example V*

| Constituents: | Parts by wt. |
|---|---|
| Sodium alginate | 19 |
| Glycerol monostearate and propylene monostearate (emulsifier) [1] | 19 |
| Water | 3764 |

[1] An emulsifier sold under the trade name Myvates 3-50.

The sodium alginate emulsion (1 gal.) is prepared in accordance with the method of Example I and is reacted with a 0.75% calcium chloride solution (0.5 gal.) required to produce the film of the algin as its calcium salt. The calcium alginate film is applied to a cultivated, raked, unrolled soil plot which was seeded with ryegrass and the film is allowed to set up. The film of this example was still in place after three weeks although the film did not remain intact as long as the films of Examples I, II, III and IV. Although there was no difference in the length of the ryegrass which was growing well after one month, the ryegrass appeared to be less thick than the grass in the plots of Examples I, II, III and IV.

*Example VI*

Example V is repeated except that the film is applied to a plot of well rolled soil and seeded with ryegrass. The results obtained were substantially the same as those described in Example V except that the film was slightly less stable which is attributable to the rolled condition of the soil. It appears as though better adherence is obtained in cultivated, raked soil rather than the well rolled soil.

Example VII

| Constituents: | Parts by wt. |
|---|---|
| Sodium alginate | 19 |
| Water | 3781 |

The sodium alginate solution (1 gal.) was prepared in accordance with the method of Example I by dissolving the sodium alginate in approximately ¾ of the required volume of water with vigorous agitation and the remaining volume of water was thereafter added with vigorous agitation. This sodium alginate solution is then combined with a 0.75% calcium chloride solution (0.5 gal.) required to film the algin as its calcium salt and the calcium alginate solution was sprayed on the plot of raked, cultivated and unrolled soil seeded with ryegrass.

The film of this example was still in place after three weeks although the film did not remain intact as long as the films of Examples I, II, III, and IV. It was felt that greater durability of the films of Examples I, II, III and IV was attributable to the plasticizer and or emulsifier systems. The condition of the grass was somewhat similar to the condition of the grass of Examples V and VI.

Example VIII

Example VII was repeated except that the film was applied to a plot having well rolled soil. The results obtained were substantially the same as those described in Example VII.

What I claim is:
1. The method of conditioning soil comprising
   reacting an aqueous solution of sodium alginate with an aqueous solution of calcium chloride to form calcium alginate solution and applying the calcium alginate solution to the surface of the soil to be treated, said sodium alginate comprising at least approximately .4 percent by weight of said aqueous solution,
   allowing said calcium alginate solution to harden and thereby form a continuous resilient film on the surface of the soil and in which the soil particles are bonded together.
2. The method of treating soil for preventing erosion thereof and for conserving moisture therein, said method comprising
   admixing an aqueous sodium alignate solution with an emulsifying agent to form an oil-in-water sodium alginate emulsion, said sodium alginate comprising at least .4 percent by weight of said sodium alginate emulsion,
   reacting said oil-in-water sodium alginate emulsion with an aqueous solution of calcium chloride to form an oil-in-water calcium alginate emulsion and applying the oil-in-water calcium alginate emulsion to the surface of the soil to be treated,
   allowing said calcium alginate emulsion to harden and thereby form a continuous resilient film on the surface of the soil and in which the soil particles are bonded together.
3. The method as defined in claim 2 wherein said emulsifying agent is a vegetable oil and said calcium alginate emulsion contains 1–25% by weight of vegetable oil.
4. The method as defined in claim 3 wherein said vegetable oil consists of corn oil.

References Cited by the Examiner

UNITED STATES PATENTS

| 2,570,537 | 10/1951 | Finch | 71—24 X |
|---|---|---|---|
| 2,935,853 | 5/1960 | Weeks | 47—58 X |

FOREIGN PATENTS

| 641,280 | 8/1950 | Great Britain. |
|---|---|---|

ABRAHAM G. STONE, *Primary Examiner.*
ROBERT E. BAGWILL, *Examiner.*